US006843185B1

(12) United States Patent
Taylor

(10) Patent No.: US 6,843,185 B1
(45) Date of Patent: Jan. 18, 2005

(54) BURNER WITH OXYGEN AND FUEL MIXING APPARATUS

(75) Inventor: Curtis L. Taylor, Gaston, IN (US)

(73) Assignee: Maxon Corporation, Muncie, IN (US)

( * ) Notice: Subject to any disclaimer, the term of this patent is extended or adjusted under 35 U.S.C. 154(b) by 0 days.

(21) Appl. No.: 10/608,375

(22) Filed: Jun. 27, 2003

(51) Int. Cl.[7] .................................................. F23D 1/00
(52) U.S. Cl. ......................... 110/261; 110/263; 110/188
(58) Field of Search .......................... 431/89, 90, 115, 431/8, 9, 10; 110/260, 261, 262, 264, 265, 185, 186, 188, 218, 219, 224, 304, 342, 345

(56) References Cited

U.S. PATENT DOCUMENTS

| 4,193,773 A | * | 3/1980 | Staudinger .................... 48/210 |
| 4,517,165 A | * | 5/1985 | Moriarty ................. 423/244.05 |
| 4,630,554 A | * | 12/1986 | Sayler et al. ................. 110/264 |
| 5,431,559 A | * | 7/1995 | Taylor ......................... 431/164 |
| 5,458,483 A | | 10/1995 | Taylor |
| 6,206,949 B1 | | 3/2001 | Kobayashi et al. |
| 6,238,206 B1 | | 5/2001 | Cummings, III et al. |
| 6,283,747 B1 | * | 9/2001 | Legiret et al. ................. 432/12 |
| 6,394,043 B1 | | 5/2002 | Bool, III et al. |
| 6,394,790 B1 | | 5/2002 | Kobayashi |

OTHER PUBLICATIONS $NO_x$ *Reduction from a 44–MW Wall–Fired Boiler Utilizing Oxygen Enhanced Combustion*, Bool and Kobayashi, date unknown, 7 pages.

*CFD Modeling and Pilot Scale Validatino of Oxy–Coal Combustion*, Chui, Douglas, and Tan, date unknown, 12 pages.

*Reduce heater $NO_x$ in the burner*, Seebold, Hydrocarbon Processing, Nov. 1982, pp. 183–186.

*A Review of Experimental Findings in Oxy–fuel Combustion at the CANMET Vertical Combustor Research Facility*, Tan, Douglas, and Chui, date unknown, 13 pages.

*Oxygen Enrichment in Boilers*, Marin, Bugeat, Macadam, and Charon, 19 pages, date unknown.

*A Study on $CO_2$ Capture from a Gas–fired Boiler by Oxyfuel Combustion without Flue Gas Recycle*, Boden, Palkes, Thompson, 2001 Joint AFRC/JFRC/IEA International Combustion Symposiuum, Sep. 0–12, 2001 10 pages.

*Development of an Advanced, Low–Emissions, Multi–Fuel Oxygen Burner*, Taylor, 55th Conference on Glass Problems, The Ohio State University, Nov. 8–9, 1994, 24 pages.

* cited by examiner

Primary Examiner—Kenneth Rinehart
(74) Attorney, Agent, or Firm—Barnes & Thornburg LLP

(57) ABSTRACT

An oxygen-fuel combustion system combines oxygen and fuel to produce a flame. The system distributes oxygen to a stream of fluidized, pulverized, solid fuel at various sites before and after ignition. The system is operable to vary the concentration of oxygen in an oxygen-fuel mixture extant at those sites.

33 Claims, 4 Drawing Sheets

BURNER WITH OXYGEN AND FUEL MIXING APPARATUS

BACKGROUND AND SUMMARY

The present disclosure relates to burner assemblies, and particularly to oxygen-fuel burner assemblies configured to burn pulverized solid fuels. More particularly, the present disclosure relates to apparatus for mixing oxygen and fuel for use in a burner.

Many types of coal and other solid fuels can be burned successfully in pulverized form. Coal is pulverized and delivered to fuel-burning equipment and then combusted in a furnace to produce heat for various industrial purposes.

A burner is used to "fire" pulverized coal and other solid fuels. In a direct-firing system, the coal is delivered to the burner in suspension in a stream of primary air, and this mixture must be mixed with a stream of secondary air at the burner.

One challenge facing the burner industry is to design an improved burner that produces lower nitrogen oxide emissions during operation than conventional burners. Typically, an industrial burner discharges a mixture of fuel and either air or oxygen. A proper ratio of fuel and air is established to produce a combustible fuel and air mixture. Once ignited, this combustible mixture burns to produce a flame that can be used to heat various products in a wide variety of industrial applications. Combustion of fuels such as natural gas, oil, liquid propane gas, low BTU gases, and pulverized coals often produce several unwanted emissions such as nitrogen oxides ($NO_x$), carbon monoxide (CO), and unburned hydrocarbons (UHC).

According to the present disclosure, an apparatus is provided for combining oxygen and fuel to produce a mixture to be burned in a burner. The apparatus includes a fuel supply tube configured to communicate a stream of fluidized, pulverized, solid fuel to a "fuel-ignition zone" provided, for example, by a flame chamber formed in a refractory shape coupled to a downstream portion of the fuel supply tube. The apparatus further includes an oxygen supply housing coupled to an upstream portion of the fuel supply tube, an oxygen manifold coupled to the downstream portion of the fuel supply tube, and an oxygen distribution system for varying the amount of oxygen conducted to the oxygen supply housing and to the oxygen manifold.

In the illustrated embodiment, the oxygen supply housing cooperates with the upstream portion of the fuel supply tube to establish an oxygen-fuel mixer defining an upstream oxygen chamber adapted to receive oxygen provided by the oxygen distribution system. The upstream portion of the fuel supply tube is formed to include an upstream set of oxygen-injection holes opening into a fuel transport passageway located in the upstream portion of the fuel supply tube. Oxygen flows through those holes to mix with a fluidized, pulverized, solid fuel flowing through the passageway to produce an oxygen-enriched (yet not spontaneously combustible) oxygen-fuel transport mixture flowing toward the fuel-ignition zone in the flame chamber.

Also in the illustrated embodiment, the oxygen manifold is configured to communicate oxygen from the oxygen distribution system to the downstream portion of the fuel supply tube to produce a combustible oxygen-fuel mixture exiting the passageway to be ignited in the fuel-ignition zone to produce a flame. The oxygen manifold also is configured to communicate oxygen from the oxygen distribution system through one or more staged-oxygen bypass conduits to a portion of the flame outside the flame-ignition zone. Such "diversion" of combustion oxygen flow through the staged-oxygen bypass conduits to a region of the flame away from the root of the flame contributes to lowered nitrogen oxide emissions.

A control system associated with the oxygen distribution system is used to operate a first valve located to regulate oxygen flow to the upstream oxygen chamber and to operate a second valve located to regulate oxygen flow to the oxygen manifold. The control system provides means for operating the first and second valves to establish: (1) how much of the oxygen obtained from an oxygen supply is routed to the upstream oxygen chamber through the upstream set of oxygen-injection holes to mix with the fluidized, pulverized, solid fuel stream in the oxygen-fuel mixer and (2) how much of that oxygen is routed to the oxygen manifold for discharge through the downstream portion of the fuel supply tube and the flame chamber inlet to the "root" of the flame and for discharge through the staged-oxygen bypass conduit to the "tip" of the flame.

In one illustrated embodiment, an oxygen sensor is arranged to detect the amount of oxygen extant in the fluidizing gas to be mixed with the pulverized solid fuel. The control system is linked to the oxygen sensor provided and cooperates with the oxygen sensor to provide means for varying the amount of oxygen conducted through the oxygen distribution system to the oxygen-fuel mixer after determining an approximate concentration of oxygen in the stream of fluidized, pulverized, solid fuel. Such means can be used to maintain the concentration of oxygen in the oxygen-enriched (yet not spontaneously combustible) oxygen-fuel transport mixture produced by the oxygen-fuel mixer in the upstream portion of the fuel supply tube at a not spontaneously combustible level.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
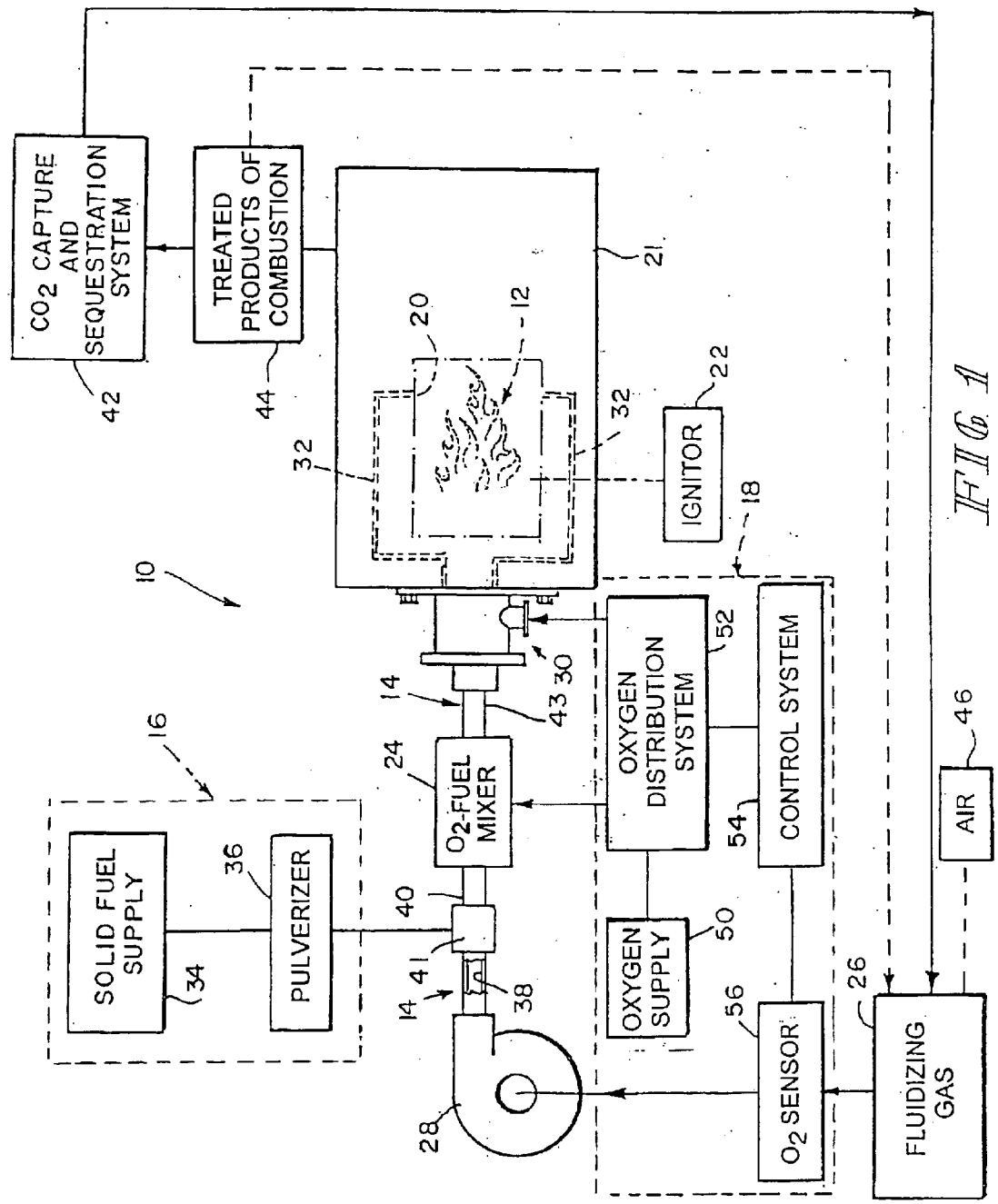
FIG. 1 is a schematic diagram showing a system for pulverizing and fluidizing a solid fuel to be fired in a staged-oxygen burner unit and showing an oxygen distribution system in accordance with the present disclosure for discharging some of the oxygen provided by an oxygen supply to an "upstream" oxygen-fuel mixer to mix with a stream of fluidized, pulverized solid fuel flowing therethrough toward a burner and discharging some of the oxygen provided by the oxygen supply to a "downstream" staged-oxygen manifold associated with the burner.

An oxygen-fuel combustion system 10 for burning a mixture of oxygen and a fluidized, pulverized, solid fuel to produce a flame 12 is shown schematically in FIG. 1. A fuel supply tube 14 conducts fuel provided by fuel delivery system 16 and oxygen provided by oxygen delivery system 18 to a flame chamber 20 provided in burner unit 21. An igniter 22 ignites the combustible oxygen-fuel mixture extant in a fuel-ignition zone provided by flame chamber 20 to produce flame 12. As used herein, "oxygen" means pure oxygen and any oxidant or oxygen-enriched mixture having an oxygen concentration of about 30% or more.

An oxygen-fuel mixer 24 is configured to mix oxygen supplied by oxygen delivery system 18 with a stream of pulverized, solid fuel supplied by fuel delivery system 16 and fluidized by fluidizing gas 26 discharged into fuel supply tube 14 using a blower 28 (or other suitable gas conveyance means). The oxygen-fuel transport mixture produced by mixer 24 is "designed" to be not spontaneously combustible.

An oxygen manifold 30 is configured to mix oxygen supplied by oxygen delivery system 18 with the not spontaneously combustible oxygen-fuel transport mixture discharged from oxygen-fuel mixer 24 to produce an oxygen-fuel mixture that is ignited in flame chamber 20 to produce a flame 12. Oxygen manifold 30 is also configured to discharge oxygen into one or more staged-oxygen bypass conduits 32 so that additional oxygen can be diverted to a region of flame 12 away from the root of flame 12 to help complete combustion of the oxygen-fuel mixture ignited by igniter 22. Oxygen delivery system 18 is configured to enable a user of oxygen-fuel combustion system to monitor and control the oxygen-fuel ratio of oxygen-fuel transport mixtures established by the oxygen-fuel mixer 24, at the inlet opening into the flame chamber 20, and at the outlet opening(s) of the staged-oxygen bypass conduit(s) 32 so as to manage the concentration of oxygen in the fuel conducted through oxygen-fuel combustion system 10 at various stages prior to and during combustion.

As suggested in FIG. 1, fuel delivery system 16 includes a solid fuel supply 34 and a pulverizer 36. Oxygen-fuel combustion system 10 is configured to allow the burning of any solid fuel, or waste fuel, that can be pulverized or ground and conveyed by air or gas. Just as pulverized coal can be conveyed by air or carbon dioxide, solid fuels such as lignite, sawdust, agricultural wastes, ground shells, etc. could be burned in oxygen-fuel combustion system 10 to produce a flame 12 and to satisfy many industrial heating or other needs.

Fuel supply tube 14 is formed to include a fuel transport passageway 38 for conveying pulverized solid fuel discharged from pulverizer 36 to flame chamber 20 in burner unit 21. Blower 28 is used to discharge fluidizing gas 26 into an upstream portion 40 of fuel supply tube 14 to fluidize the pulverized solid fuel that is admitted into fuel transport passageway 38 at inlet port 41. Fluidizing gas 26 is used to fluidize and convey the pulverized solid fuel through oxygen-fuel mixer 24 and oxygen manifold 30 and into flame chamber 20.

Many gases are suitable for use in fluidizing pulverized solid fuel discharged into fuel transport passageway 38. In one illustrative embodiment, a carbon dioxide ($CO_2$) capture and sequestration system 42 is used to capture carbon dioxide generated during combustion in burner unit 21 so that the captured carbon dioxide is used as the fluidizing gas 26. In another illustrative embodiment, treated products of combustion 44 generated during combustion in burner unit 21 provide fluidizing gas. In yet another embodiment, air 46 from any suitable source is used as the fluidizing gas 26.

As suggested in FIG. 1, oxygen delivery system 18 includes an oxygen supply 50, an oxygen distribution system 52, a control system 54, and an oxygen sensor 56. It is within the scope of this disclosure to place the oxygen sensor in any suitable location to sense the concentration of oxygen in fluidizing gas 26 communicated to fuel supply tube 14. The oxygen concentration level sensed by oxygen sensor 56 is communicated to control system 54 as suggested diagrammatically in FIG. 1.

Control system 54 is configured to provide means for operating oxygen distribution system 52 to vary or otherwise regulate the amount of oxygen supplied to oxygen-fuel mixer 24 and to oxygen manifold 30. Using control system 54, a system operator can cause an oxygen-enriched (yet not spontaneously combustible) oxygen-fuel transport mixture to be discharged from oxygen-fuel mixer 24 into a downstream portion 43 of fuel supply tube 14 arranged to communicate with flame chamber 20 formed in burner unit 21. Also using control system 54, a system operator can cause sufficient oxygen to pass through oxygen manifold 30 to raise the oxygen concentration in the oxygen-fuel mixture discharged from fuel supply tube 14 into flame chamber 20 at or very near an outlet end of downstream portion 43 of fuel supply tube 14. System operator can also regulate the amount of oxygen allowed to flow from oxygen manifold 30 into staged-oxygen bypass conduits 32 using control system 54.

Control system 54 is used to allow an operator to adjust oxygen-fuel combustion system 10 in the field to provide optimum emission without compromising flame stability. It could also be used to allow adjustments as a plant begins operation and uses air as fluidizing gas 26. As the plant start-up progresses, recirculated flue gas ($CO_2$) becomes available and the level of oxygen enrichment established by oxygen-fuel mixer 24 would, or could, increase. Control system 54 is also used to allow an operator to establish and vary the ratio of oxygen extant in the oxygen-fuel mixture discharged into the flame chamber 20 through fuel supply tube 14 to "feed" the root of flame 12 versus the oxygen discharged through the staged-oxygen bypass conduits 32 to feed the tip of flame 12.

Figure 2:
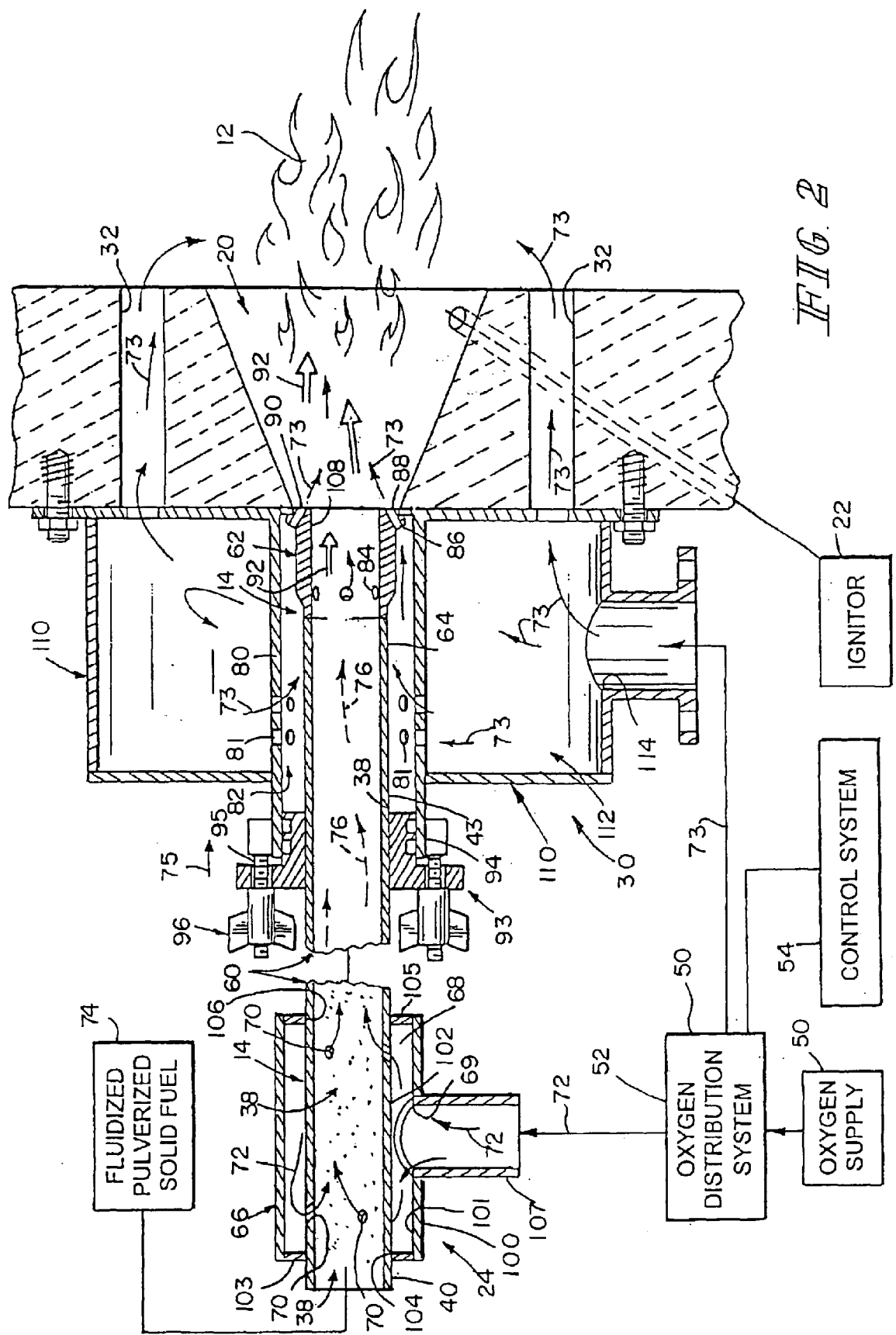
FIG. 2 is a sectional view of a portion of the fuel supply tube, an oxygen-fuel mixer (on the left side of FIG. 2) defined in part by an upstream portion of the fuel supply tube and adapted to receive oxygen from the oxygen distribution system, a refractory shape provided by a burner block (on the right side of FIG. 2) formed to include a flame chamber and at least two staged-oxygen bypass conduits, and an oxygen manifold associated with a downstream portion of the fuel supply tube and configured to conduct oxygen from the oxygen distribution system to the staged-oxygen bypass conduits and to the downstream portion of the fuel supply tube at a point near an inlet into the flame chamber of the burner block, and showing an igniter arranged to ignite a combustible oxygen-fuel mixture extant in the flame chamber.

Various components included in oxygen-fuel combustion system 10 are shown in greater detail in FIG. 2. Fuel supply tube 14 includes a solid-fuel conduit 60 and an oxygen-fuel nozzle 62 coupled to a downstream end 64 of solid-fuel conduit 60 as shown in FIG. 2. Reference is made to U.S.

application Ser. No. 10/407,489, entitled "Apparatus for Burning Pulverized Solid Fuels with Oxygen," filed Apr. 4, 2003, which disclosure is hereby incorporated by reference herein, for a description of a suitable solid-fuel conduit, oxygen-fuel nozzle, and staged-oxygen system.

Oxygen supply housing 66 is coupled to upstream portion 40 of solid-fuel conduit 60 of fuel-supply tube 14 to define an upstream oxygen chamber 68 therebetween as suggested, for example, in FIG. 2. Oxygen supply housing 66 is formed to include an oxygen inlet 69 adapted to admit oxygen into upstream oxygen chamber 68. Upstream portion 40 of solid-fuel conduit 60 is formed to include an upstream set of oxygen-injection holes 70 opening into fuel transport passageway 38 as shown in FIG. 2 to establish oxygen-fuel mixer 24.

As suggested in FIG. 2, oxygen 72 from oxygen supply 50 flows first through oxygen distribution system 52 into upstream oxygen chamber 68 provided in oxygen-fuel mixer 24 and then into fuel transport passageway 38 through oxygen-injection holes 70. The oxygen 72 mixes with fluidized, pulverized, solid fuel 74 (represented by particles in FIG. 2) flowing through fuel transport passageway 38 in downstream direction 75. The amount of oxygen 72 discharged into upstream oxygen chamber 68 is regulated using oxygen distribution system 52 and control system 54 to cause oxygen 72 to mix with fluidized, pulverized, solid fuel 74 in oxygen-fuel mixer 24 to produce an oxygen-enriched (yet not spontaneously combustible) oxygen-fuel transport mixture 76 (represented by dashed lines in FIG. 2). This not spontaneously combustible transport mixture 76 flows in direction 75 through passageway 38 in solid-fuel conduit 60 and exits conduit 60 at downstream end 64 and enters oxygen-fuel nozzle 62 as shown in FIG. 2.

Oxygen supply housing 66 includes a sleeve 100 having an annular inner surface 101 as shown in FIG. 2. In the illustrated embodiment, sleeve 100 is a cylinder-shaped side wall. Upstream portion 40 of solid-fuel conduit 60 of fuel supply tube 14 passes through a channel defined by annular inner surface 101 of sleeve 100. An annular exterior surface 102 of the upstream portion 40 of solid-fuel conduit 60 cooperates with annular inner surface 101 of sleeve 100 to define upstream oxygen chamber 68 therebetween as shown in FIG. 2.

Oxygen supply housing 66 further includes a first end wall 103 coupled to a first end of sleeve 100 and formed to include a first opening 104 receiving upstream portion 40 of solid-fuel conduit 60 therein. Housing 66 also includes a second end wall 105 coupled to a second end of sleeve 100 and formed to include a second opening 106 receiving upstream portion 40 therein. Annular exterior surface 102 of the upstream portion 40, annular inner surface 101 of the sleeve 100, and inner surfaces of first and second end walls 103, 105 cooperate to define a boundary of the upstream oxygen chamber 68. Sleeve 100 is formed to include oxygen inlet 69 and sleeve 66 is positioned to lie in spaced-apart relation to outer tube 80 (described below) as shown in FIG. 2. A tube 107 is coupled to sleeve 100 at oxygen inlet to 69 to deliver oxygen into upstream oxygen chamber 68. Sleeve 100 and tube 107 cooperate to define a T-shaped member mating with upstream portion 40 of solid-fuel conduit 60 as shown, for example, in FIG. 2.

An outer tube 80 is located in a fixed position relative to a downstream portion of solid-fuel conduit 60 to define an annular oxygen flow passage 82 therebetween as suggested in FIG. 2. Outer tube 80 is formed to include an oxygen inlet defined by a second set of oxygen-injection holes 81 opening into oxygen flow passage 82 to communicate oxygen 73 into oxygen flow passage 82. A sealed closure 93 mates with a first end 94 of outer tube 80 to block flow of oxygen 73 through first end 94 so that oxygen 73 admitted into oxygen flow passage 82 through the oxygen inlet established by holes 81. Suitable anchors 95 and anchor-engaging fasteners 96 are configured to retain sealed closure 93 in a fixed position on outer tube 80 as suggested in FIG. 2.

Oxygen-fuel nozzle 62 is formed to include a downstream set of oxygen-injection holes 84 opening into the portion of fuel transport passageway 38 formed in nozzle 62. Nozzle 62 is also formed to include oxygen-discharge passages 86 arranged to conduct oxygen 73 from oxygen flow passage 82 through openings 88 formed in outlet end face 90 of nozzle 62 to mix outside of nozzle 62 with the oxygen-fuel mixture 92 generated in nozzle 62 and discharged into flame chamber 20. Reference is made to U.S. application Ser. No. 10/407,489, entitled "Apparatus for Burning Pulverized Solid Fuels with Oxygen," filed Apr. 4, 2003, for descriptions of suitable oxygen-fuel nozzles.

A second oxygen-supply housing 110 is arranged to cooperate with outer tube 80 as shown, for example, in FIG. 2 to define a second oxygen chamber 112 adapted to receive oxygen 73 from oxygen distribution system 52. Second oxygen-supply housing 110 is formed to include an oxygen inlet 114 adapted to admit oxygen 73 into second oxygen chamber 112 and an oxygen outlet arranged to discharge oxygen 73 extant in second oxygen chamber 112 in staged-oxygen bypass conduits 32.

In use, oxygen deliver system 18 conducts a first stream of oxygen 72 through the upstream set of oxygen-injection holes 70 to mix with fluidized, pulverized, solid fuel 74 conducted through passageway 38 in upstream portion 40 of fuel supply tube 14 to produce an oxygen-enriched (yet not spontaneously combustible) oxygen-fuel transport mixture 76. Oxygen delivery system 18 also conducts a second stream of oxygen 73 through oxygen inlet 81 formed in outer tube 80 and into oxygen flow passage 82 to pass through the downstream set of oxygen-injection holes 84 to mix with the oxygen-enriched (yet not spontaneously combustible) oxygen-fuel transport mixture 76 conducted through passageway 38 in the downstream portion 64 of the fuel supply tube 14 to produce an oxygen-fuel mixture 92 exiting passageway 38 through an outlet 108 of fuel supply tube 14 to be ignited by igniter 22 outside passageway 38 to produce a flame 12.

Oxygen delivery system 18 further includes means for approximating the concentration of oxygen in the stream of fluidized, pulverized, solid fuel 74 and varying the amount of oxygen 72 conducted through the upstream set of oxygen-injection holes 70 to maintain the concentration of oxygen in the oxygen-enriched (yet not spontaneously combustible) oxygen-fuel transport mixture 76 produced in upstream portion 40 of the fuel supply tube 14 at a not spontaneously combustible level. In one embodiment, an oxygen sensor 56 is located to sense the concentration of oxygen in fluidizing gas 26.

Oxygen delivery system 18 further includes distribution means 52 for varying an amount of oxygen 72 supplied to passageway 38 located in upstream portion 40 of fuel supply tube 14 and an amount of oxygen 73 supplied to the passageway 38 located in downstream portion 64 of fuel supply tube 14. Distribution means 52 operates to vary an amount of primary oxygen 72 supplied to the passageway 38 in upstream portion 40 of fuel supply tube 14 and an amount of secondary oxygen 73 supplied by (1) to the passageway 38 in downstream portion 64 of fuel supply tube 14 and (2) to staged-oxygen bypass conduit(s) 32 to regulate the relative concentration of the oxygen-enriched (yet not spontaneously combustible) oxygen-fuel transport mixture 76 and the combustible oxygen-fuel mixture 92 so that a selected ratio of primary and secondary oxygen 72, 73 is achieved to optimize emissions generated by burning the oxygen-fuel mixture 92 in the flame chamber 20 and adjust for variations in physical properties of pulverized solid fuel entrained in a stream of fluidizing gas 26 to produce the fluidized, pulverized, solid fuel 74.

Figure 3:
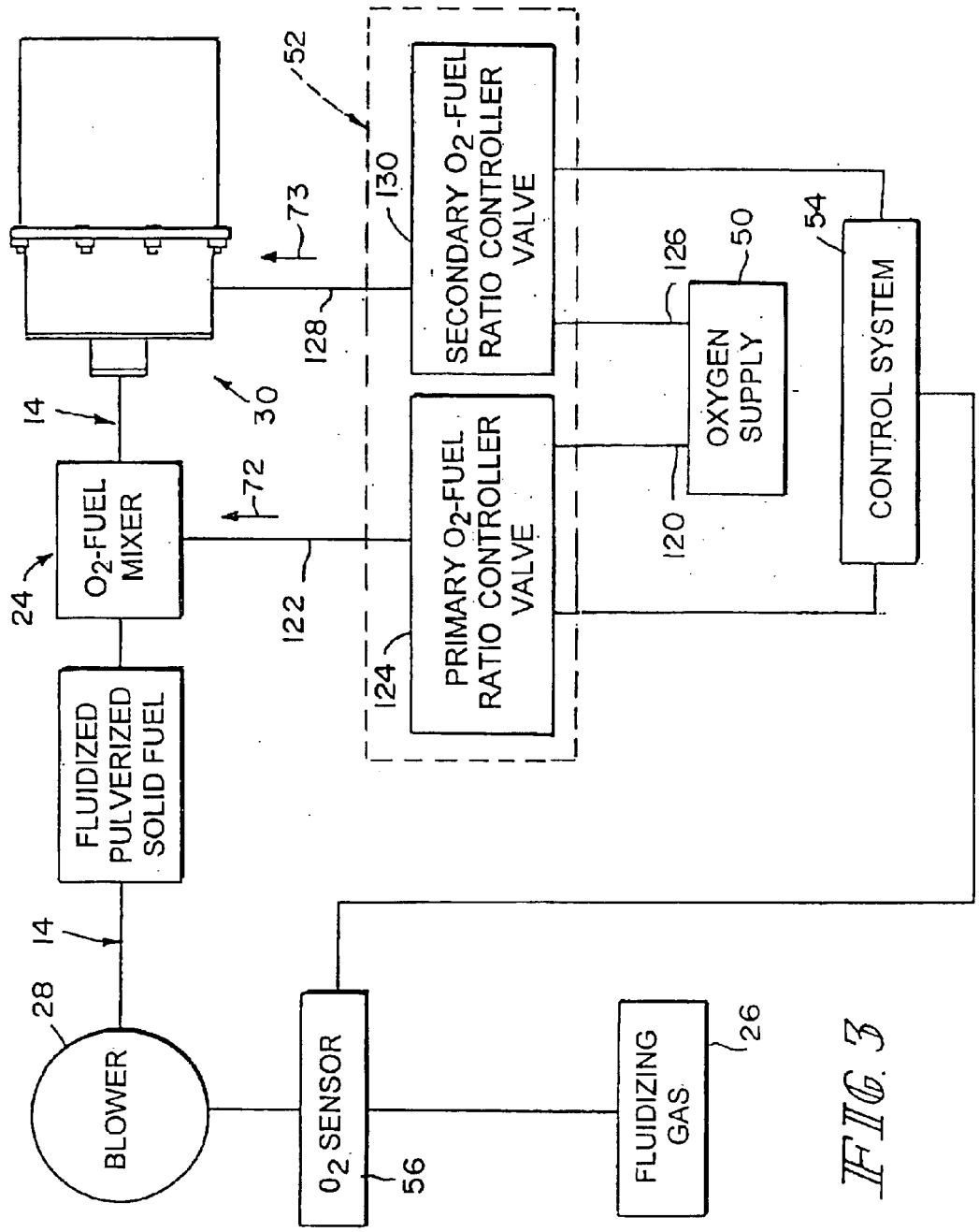
FIG. 3 is a schematic view similar to FIG. 1 showing a first embodiment of the oxygen distribution system comprising a primary oxygen-fuel "ratio controller" valve for varying the flow of "primary" oxygen from the oxygen supply to the oxygen-fuel mixer to control the ratio of oxygen and fuel in the fuel supply tube downstream of the oxygen-fuel mixer and a secondary oxygen-fuel ratio controller valve for varying the flow of "secondary" oxygen from the oxygen supply to the oxygen manifold to control the ratio of oxygen and fuel in the flame chamber and in the vicinity of the flame chamber outlet.
Figure 4:
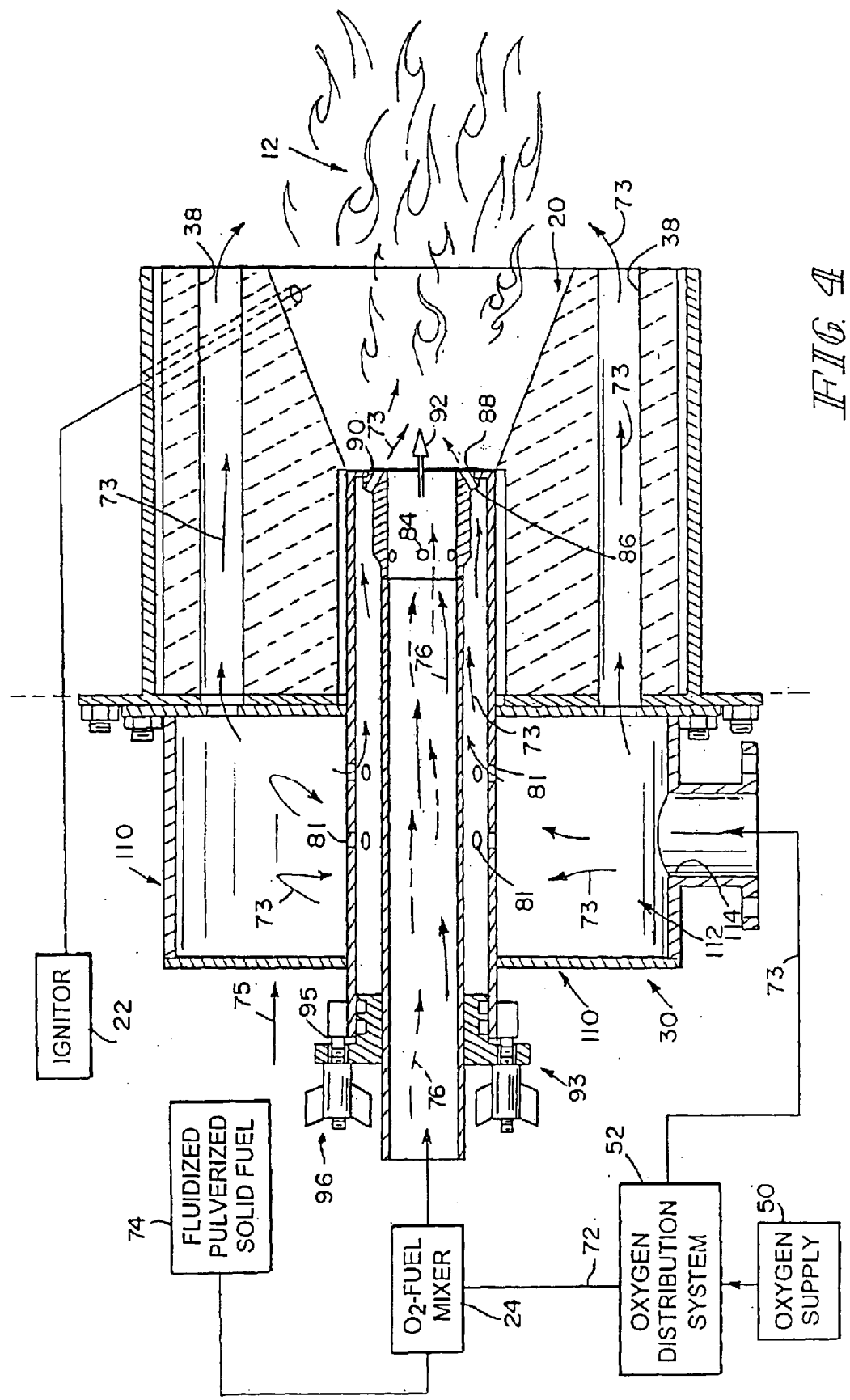
FIG. 4 is a sectional view similar to FIG. 2 of a second embodiment of an oxygen burner unit according to the present disclosure wherein a solid-fuel nozzle module associated with the downstream portion of the fuel supply tube is mounted in the oxygen manifold to extend into an inlet passageway formed in the burner block to communicate with the flame chamber.

As shown diagrammatically in FIG. 3, oxygen distribution system 52 includes a first oxygen supply tube 120 arranged to conduct oxygen from the oxygen supply 50 to a first oxygen conductor 122 coupled to oxygen fuel mixer 24, a primary oxygen-fuel ratio controller valve 124 associated with first oxygen supply tube 120 to regulate flow of oxygen from oxygen supply 50 to a first oxygen conductor 122. Oxygen distribution system 52 also includes a second oxygen supply tube 126 arranged to conduct oxygen from oxygen supply 50 to a second oxygen conductor 128 coupled to oxygen manifold 30, a staged oxygen-fuel ratio controller valve 130 associated with second oxygen supply tube 126 to regulate flow of oxygen from oxygen supply 50 to the second oxygen conductor 128. Control system 54 provides means for opening and closing the primary and staged oxygen-fuel ratio controller valves 124, 130 to establish the selected ratio of primary and staged oxygen 72, 73 used in oxygen-fuel combustion system 10. In use, control system 54 operates the primary and secondary oxygen-fuel ratio controller valves 124, 130 to regulate the relative concentration of oxygen (1) in an oxygen-enriched (yet not spontaneously combustible) oxygen-fuel transport mixture established in passageway 38 formed in fuel supply tube 14 when primary oxygen 72 from first oxygen chamber 68 flows through the first set of oxygen-injection holes 70 formed in fuel supply tube 14 to mix with fluidized, pulverized, solid fuel 74 passing therethrough and (2) in an oxygen-fuel mixture established by mixing an oxygen-fuel mixture 92 discharged into the flame chamber 20 with secondary oxygen 73 discharged from staged-oxygen bypass conduit(s) 32 so that a selected ratio of primary and secondary oxygen 72, 73 is achieved to optimize emissions generated by burning the oxygen-fuel mixture 92 extant in the flame chamber 20 and adjust for variations in physical properties of pulverized solid fuel included in the fluidized, pulverized solid fuel 74.

Control system 54 is used to control the oxygen concentration of the oxygen-fuel mixture extant in oxygen-fuel mixer 24 to minimize opportunity for premature ignition of that oxygen-fuel mixture in fuel supply tube 14. The oxygen concentration is maintained at an optimal percentage to enhance emissions performance of system 10, while at the same time monitoring and maintaining the oxygen concentration below a threshold level in fuel supply tube 14. Overall control of excess oxygen inside the boiler or process (after combustion), is the result of oxygen sensors on the stack feeding information to control system 54. Valves 124, 130 shown in FIG. 3 are individually controlled and used to feed a calculated (and measured by flowmeters) amount of oxygen into each zone (primary and staged). Such an arrangement allows for adjustment and tuning of the primary versus staged oxygen flow ratios to optimize emissions and adjust for differences in the physical properties of coal or other solid fuel.

What is claimed is:

1. An apparatus for combining oxygen and fuel to produce a mixture to be burned in a burner, the apparatus comprising a fuel supply system including a solid-fuel conduit formed to include a fuel transport passageway, the solid-fuel conduit including a side wall formed to include oxygen-injection holes opening into the fuel transport passageway, and first oxygen conductor means for conducting a first stream of oxygen through the oxygen-injection holes formed in the side wall of the solid-fuel conduit to mix with fluidized, pulverized, solid fuel conducted through the fuel transport passageway prior to combustion to produce an oxygen-enriched, not spontaneously combustible, oxygen-fuel transport mixture, wherein the first oxygen conductor means includes a first oxygen-supply housing formed to include first and second openings, an oxygen chamber adapted to receive a supply of oxygen, and an oxygen inlet adapted to admit oxygen into the oxygen chamber, and the solid-fuel conduit extends through the first and second openings to place the oxygen-injection holes in the oxygen chamber to allow oxygen extant in the oxygen chamber to flow through the oxygen-injection holes into the fuel transport passageway formed in the solid-fuel conduit.

2. The apparatus of claim 1, wherein the first oxygen supply housing includes a cylinder-shaped side wall formed to include the oxygen inlet, a first end wall coupled to one end of the cylinder-shaped side wall and formed to include the first opening, and a second end wall coupled to another end of the cylinder-shaped side wall and formed to include the second opening, and wherein the cylinder-shaped side wall, the first and second end walls, and a portion of the solid-fuel conduit cooperate to define the oxygen chamber therebetween.

3. The apparatus of claim 1, further comprising a burner unit formed to include a flame chamber arranged to receive the oxygen-enriched, not spontaneously combustible, oxygen-fuel transport mixture and a carbon dioxide capture and sequestration system coupled to the burner unit and to the solid-fuel conduit to capture carbon dioxide produced in the flame chamber to produce a fluidizing gas used to fluidize the fluidized, pulverized, solid fuel conducted through the fuel-transport passageway formed in the solid-fuel conduit.

4. An apparatus for combining oxygen and fuel to produce a mixture to be burned in a burner, the apparatus comprising a fuel supply tube formed to include an inlet, an outlet, and a passageway extending therethrough from the inlet to the outlet, moving means for moving a stream of fluidized, pulverized, solid fuel fluidized using a fluidizing gas in a downstream direction into the passageway through the inlet and out of the passageway through the outlet, an oxygen supply housing coupled to an upstream portion of the fuel supply tube to define an upstream oxygen chamber therebetween and formed to include an oxygen inlet adapted to admit oxygen into the upstream oxygen chamber, the upstream portion of the fuel supply tube being formed to include an upstream set of oxygen-injection holes opening into the passageway located in the upstream portion of the fuel supply tube, an outer tube coupled to a downstream portion of the fuel supply tube to define an oxygen flow passage therebetween and formed to include an oxygen inlet adapted to admit oxygen into the oxygen flow passage, the downstream portion of the fuel supply tube being formed to include a downstream set of oxygen-injection holes opening into the passageway located in the downstream portion of the fuel supply tube, and an oxygen delivery system including first oxygen conductor means for conducting a first stream of oxygen through the upstream set of oxygen-injection holes to mix with fluidized, pulverized, solid fuel conducted through the passageway in the upstream portion of the fuel supply tube to produce an oxygen-enriched, yet not spontaneously combustible, oxygen-fuel transport mixture and second oxygen conductor means for conducting a second stream of oxygen through the oxygen inlet formed in the outer tube and into the oxygen flow passage to pass through the downstream set of oxygen-injection holes to mix with the oxygen-enriched, yet not spontaneously combustible, oxygen-fuel transport mixture conducted through the passageway in the downstream portion of the fuel supply tube to produce an oxygen-fuel mixture exiting the passageway through the outlet of the fuel supply tube to be ignited outside the passageway to produce a flame.

5. The apparatus of claim 4, further comprising a burner unit formed to include a flame chamber arranged to receive the oxygen-fuel mixture exiting the passageway through the outlet of the fuel supply tube and a carbon dioxide capture and sequestration system coupled to the burner unit and to the moving means to capture carbon dioxide produced in the flame chamber to produce the fluidizing gas used to fluidize the stream of fluidized, pulverized, solid fuel.

6. The apparatus of claim 4, further comprising a refractory shape formed to include a flame chamber receiving the oxygen-fuel mixture exiting the passageway through the outlet of the fuel supply tube and the oxygen delivery system further includes distribution means for varying an amount of oxygen supplied to the passageway located in the upstream portion of the fuel supply tube by the first oxygen conductor means and an amount of oxygen supplied to the passageway located in the downstream portion of the fuel supply tube by the second oxygen conductor means.

7. An apparatus for combining oxygen and fuel to produce a mixture to be burned in a burner, the apparatus comprising a fuel supply tube formed to include an inlet, an outlet, and a passageway extending therethrough from the inlet to the outlet, moving means for moving a stream of fluidized, pulverized, solid fuel fluidized using a fluidizing gas in a downstream direction into the passageway through the inlet and out of the passageway through the outlet, an oxygen supply housing coupled to an upstream portion of the fuel supply tube to define an upstream oxygen chamber therebetween and formed to include an oxygen inlet adapted to admit oxygen into the upstream oxygen chamber, the upstream portion of the fuel supply tube being formed to include an upstream set of oxygen-injection holes opening into the passageway located in the upstream portion of the fuel supply tube, an outer tube coupled to a downstream portion of the fuel supply tube to define an oxygen flow passage therebetween and formed to include an oxygen inlet adapted to admit oxygen into the oxygen flow passage, the downstream portion of the fuel supply tube being formed to include a downstream set of oxygen-injection holes opening into the passageway located in the downstream portion of the fuel supply tube, and an oxygen delivery system including first oxygen conductor means for conducting a first stream of oxygen through the upstream set of oxygen-injection holes to mix with fluidized, pulverized, solid fuel conducted through the passageway in the upstream portion of the fuel supply tube to produce an oxygen-enriched, yet not spontaneously combustible, oxygen-fuel transport mixture and second oxygen conductor means for conducting a second stream of oxygen through the oxygen inlet formed in the outer tube and into the oxygen flow passage to pass through the downstream set of oxygen-injection holes to mix with the oxygen-enriched, yet not spontaneously combustible, oxygen-fuel transport mixture conducted through the passageway in the downstream portion of the fuel supply tube to produce an oxygen-fuel mixture exiting the passageway through the outlet of the fuel supply tube to be ignited outside the passageway to produce a flame, wherein the oxygen delivery system further includes means for determining concentration of oxygen in a fluidizing gas used to fluidize the stream of fluidized, pulverized, solid fuel and varying the amount of oxygen conducted through the upstream set of oxygen-injection holes by the first oxygen conductor means after determining the concentration of oxygen in the fluidizing gas to maintain the concentration of oxygen in the oxygen-enriched, yet not spontaneously combustible, oxygen-fuel transport mixture produced in the upstream portion of the fuel supply tube at a not spontaneously combustible level.

8. The apparatus of claim 7, further comprising a burner unit formed to include a flame chamber arranged to receive the oxygen-fuel mixture exiting the passageway through the outlet of the fuel supply tube and a carbon dioxide capture and sequestration system coupled to the burner unit and to the moving means to capture carbon dioxide produced in the flame chamber to produce the fluidizing gas used to fluidize the stream of fluidized, pulverized, solid fuel.

9. An apparatus for combining oxygen and fuel to produce a mixture to be burned in a burner, the apparatus comprising a fuel supply tube formed to include an inlet, an outlet, and a passageway extending therethrough from the inlet to the outlet, moving means for moving a stream of fluidized, pulverized, solid fuel fluidized using a fluidizing gas in a downstream direction into the passageway through the inlet and out of the passageway through the outlet, an oxygen supply housing coupled to an upstream portion of the fuel supply tube to define an upstream oxygen chamber therebetween and formed to include an oxygen inlet adapted to admit oxygen into the upstream oxygen chamber, the upstream portion of the fuel supply tube being formed to include an upstream set of oxygen-injection holes opening into the passageway located in the upstream portion of the fuel supply tube, an outer tube coupled to a downstream portion of the fuel supply tube to define an oxygen flow passage therebetween and formed to include an oxygen inlet adapted to admit oxygen into the oxygen flow passage, the downstream portion of the fuel supply tube being formed to include a downstream set of oxygen-injection holes opening into the passageway located in the downstream portion of the fuel supply tube, and an oxygen delivery system including first oxygen conductor means for conducting a first stream of oxygen through the upstream set of oxygen-injection holes to mix with fluidized, pulverized, solid fuel conducted through the passageway in the upstream portion of the fuel supple tube to produce an oxygen-enriched, yet not spontaneously combustible, oxygen-fuel transport mixture and second oxygen conductor means for conducting a second stream of oxygen through the oxygen inlet formed in the outer tube and into the oxygen flow passage to pass through the downstream set of oxygen-injection holes to mix with the oxygen-enriched, yet not spontaneously combustible, oxygen-fuel transport mixture conducted through the passageway in the downstream portion of the fuel supply tube to produce an oxygen-fuel mixture exiting the passageway through the outlet of the fuel supply to be ignited outside the passageway to produce a flame, and further comprising a refractory shape formed to include a flame chamber having an inlet opening and an outlet opening and receiving the oxygen-fuel mixture exiting the passageway through the outlet end of the fuel supply tube, and wherein the refractory shape is also formed to include a staged-oxygen bypass conduit arranged to receive oxygen conducted by the second oxygen conductor means and to conduct oxygen outside of the flame chamber to the outlet opening of the flame chamber and the oxygen delivery system further includes distribution means for varying an amount of primary oxygen supplied by the first conductor means to the passageway in the upstream portion of the fuel supply tube and an amount of secondary oxygen supplied by the second conductor means to the passageway in the downstream portion of the fuel supply tube and to the staged-oxygen bypass conduit to regulate the relative concentration of the oxygen-enriched, yet not spontaneously combustible, oxygen-fuel transport mixture and the oxygen-fuel mixture so that a selected ratio of primary and secondary oxygen is achieved to optimize emissions generated by burning the oxygen-fuel mixture in the flame chamber and adjust for variations in physical properties of pulverized solid fuel entrained in a fluidizing gas used to fluidize the fluidized, pulverized, solid fuel.

10. The apparatus of claim 9, further comprising a carbon dioxide capture and sequestration system coupled to the flame chamber and to the fuel supply tube to capture carbon dioxide produced in the flame chamber to produce the stream of fluidizing gas used to fluidize the stream of fluidized, pulverized, solid fuel.

11. An apparatus for combining oxygen and fuel to produce a mixture to be burned in a burner, the apparatus comprising
a fuel supply tube formed to include an inlet, an outlet, and a passageway extending therethrough from the inlet to the outlet,
moving means for moving a stream of fluidized, pulverized, solid fuel fluidized using a fluidizing as in a downstream direction into the passageway through the inlet and out of the passageway through the outlet,
an oxygen supply housing coupled to an upstream portion of the fuel supply tube to define an upstream oxygen chamber therebetween and formed to include an oxygen inlet adapted to admit oxygen into the upstream oxygen chamber, the upstream portion of the fuel supply tube being formed to include an upstream set of oxygen-injection holes opening into the passageway located in the upstream portion of the fuel supply tube,
an outer tube coupled to a downstream portion of the fuel supply tube to define an oxygen flow passage therebetween and formed to include an oxygen inlet adapted to admit oxygen into the oxygen flow passage, the downstream portion of the fuel supply tube being formed to include a downstream set of oxygen-injection holes opening into the passageway located in the downstream portion of the fuel supply tube, and
an oxygen delivery system including first oxygen conductor means for conducting a first stream of oxygen through the upstream set of oxygen-injection holes to mix with fluidized, pulverized, solid fuel conducted through the passageway in the upstream portion of the fuel supply tube to produce an oxygen-enriched, yet not spontaneously combustible, oxygen-fuel transport mixture and second oxygen conductor means for conducting a second stream of oxygen through the oxygen inlet formed in the outer tube and into the oxygen flow passage to pass through the downstream set of oxygen-injection holes to mix with the oxygen-enriched, yet not spontaneously combustible, oxygen-fuel transport mixture conducted through the passageway in the downstream portion of the fuel supply tube to produce an oxygen-fuel mixture exiting the passageway through the outlet of the fuel supply tube to be ignited outside the passageway to produce a flame, wherein the oxygen supply housing includes a sleeve having an annular inner surface, the upstream portion of the fuel supply tube passes through a channel defined by the annular inner surface of the sleeve, and an annular exterior surface of the upstream portion of the fuel supply tube cooperates with the annular inner surface of the sleeve to define the upstream oxygen chamber therebeween.

12. The apparatus of claim 11, wherein the oxygen supply housing further includes a first end wall coupled to a first end of the sleeve and formed to include a first opening receiving the upstream portion of the fuel supply tube therein and a second end wall coupled to a second end of the sleeve and formed to include a second opening receiving the upstream portion of the fuel supply tube therein, and the annular exterior surface of the upstream portion of the fuel supply tube, the annular inner surface of the sleeve, and inner surfaces of the first and second end walls cooperate to define a boundary of the upstream oxygen chamber.

13. The apparatus of claim 12, wherein the sleeve is formed to include the oxygen inlet.

14. The apparatus of claim 11, wherein the sleeve is positioned to lie in spaced-apart relation to the outer tube.

15. The apparatus of claim 11, wherein the sleeve is formed to include the oxygen inlet, the first oxygen conductor means includes a tube coupled to the sleeve at the oxygen inlet to deliver oxygen into the upstream oxygen chamber, and the sleeve and the tube cooperate to define a T-shaped member mating with upstream portion of fuel supply tube.

16. The apparatus of claim 11, further comprising a burner unit formed to include a flame chamber arranged to receive the oxygen-fuel mixture exiting the passageway through the outlet of the fuel supply tube and a carbon dioxide capture and sequestration system coupled to the burner unit and to the moving means to capture carbon dioxide produced in the flame chamber to produce the fluidizing gas used to fluidize the stream of fluidized, pulverized, solid fuel.

17. An apparatus for combining oxygen and fuel to produce a mixture to be burned in a burner, the apparatus comprising
a fuel supply tube formed to include an inlet, an outlet, and a passageway extending therethrough from the inlet to the outlet,
means for moving a stream of fluidized, pulverized, solid fuel fluidized using a fluidizing gas in a downstream direction into the passageway through the inlet and out of the passageway through the outlet, an oxygen supply housing coupled to an upstream portion of the fuel supply tube to define an upstream oxygen chamber therebetween and formed to include an oxygen inlet adapted to admit oxygen into the upstream oxygen chamber, the upstream portion of the fuel supply tube being formed to include an upstream set of oxygen-injection holes opening into the passageway located in the upstream portion of the fuel supply tube, an outer tube coupled to a downstream portion of the fuel supply tube to define an oxygen flow passage therebetween and formed to include an oxygen inlet adapted to admit oxygen into the oxygen flow passage, the downstream portion of the fuel supply tube being formed to include a downstream set of oxygen-injection holes opening into the passageway located in the downstream portion of the fuel supply tube, and an oxygen delivery system including first oxygen conductor means for conducting a first stream of oxygen through the upstream set of oxygen-injection holes to mix with fluidized, pulverized, solid fuel conducted through the passageway in the upstream portion of the fuel supply tube to produce an oxygen-enriched, yet not spontaneously combustible, oxygen-fuel transport mixture and second oxygen conductor means for conducting a second stream of oxygen through the oxygen inlet formed in the outer tube and into the oxygen flow passage to pass through the downstream set of oxygen-injection holes to mix with the oxygen-enriched, yet not spontaneously combustible, oxygen-fuel transport mixture conducted through the passageway in the downstream portion of the fuel supply tube to produce an oxygen-fuel mixture exiting the passageway through the outlet of the fuel supply tube to be ignited outside the passageway to produce a flame, and further comprising a refractory shape formed to include a flame chamber having an inlet opening and an outlet opening and receiving the combustible oxygen-fuel mixture exiting the passageway through the outlet end of the fuel supply tube and wherein the outer tube is positioned to lie between the oxygen supply housing and the refractory shape.

18. The apparatus of claim 17, wherein the second oxygen conductor means includes a second oxygen supply housing coupled to the outer tube and to the refractory shape to define a second oxygen chamber located to allow oxygen extant in the second oxygen chamber to flow into the oxygen flow passage through the oxygen inlet formed in the outer tube.

19. The apparatus of claim 18, wherein the refractory shape is also formed to include a staged-oxygen bypass conduit arranged to receive oxygen flowing out of the second oxygen chamber through an oxygen outlet formed in the second oxygen supply housing and to conduct said oxygen to the outlet opening of the flame chamber.

20. The apparatus of claim 17, further comprising a carbon dioxide capture and sequestration system coupled to the flame chamber and to the fuel supply tube to capture carbon dioxide produced in the flame chamber to produce the stream of fluidizing gas used to fluidize the stream of fluidized, pulverized, solid fuel.

21. An apparatus for combining oxygen and fuel to produce a mixture to be burned in a burner, the apparatus comprising a fuel supply system including a solid-fuel conduit formed to include a fuel transport passageway, the solid-fuel conduit including a side wall formed to include oxygen-injection holes opening into the fuel transport passageway, and first oxygen conductor means for conducting a first stream of oxygen through the oxygen-injection holes formed in the side wall of the solid-fuel conduit to mix with fluidized, pulverized, solid fuel conducted through the fuel transport passageway prior to combustion to produce an oxygen-enriched, not spontaneously combustible, oxygen-fuel transport mixture, wherein the first oxygen conductor means includes a first oxygen-supply housing formed to include first and second openings, an oxygen chamber adapted to receive a supply of oxygen, and an oxygen inlet adapted to admit oxygen into the oxygen chamber, and the solid-fuel conduit extends through the first and second openings to place the oxygen-injection holes in the oxygen chamber to allow oxygen extant in the oxygen chamber to flow through the oxygen-injection holes into the fuel transport passageway formed in the solid-fuel conduit and further comprising means for conducting a stream of fluidizing gas into the fuel transport passageway, means for discharging a pulverized solid fuel into the stream of fluidizing gas to produce a fluidized, pulverized, solid fuel flowing through the fuel transport passageway, oxygen supply means for supplying oxygen to the oxygen chamber formed in the first oxygen-supply housing through the oxygen inlet, and means for determining concentration of oxygen in the stream of fluidizing gas and varying the amount of oxygen supplied to the oxygen chamber by the oxygen supply means after determining the concentration of oxygen in the stream of fluidizing gas to maintain the concentration of oxygen in the oxygen-fuel transport mixture produced in the fuel transport passageway upon discharge of the pulverized solid fuel into the stream of fluidizing gas at a not spontaneously combustible level.

22. The apparatus of claim 21, further comprising a burner unit formed to include a flame chamber arranged to receive the oxygen-enriched, not spontaneously combustible, oxygen-fuel transport mixture and a carbon dioxide capture and sequestration system coupled to the burner unit and to the solid-fuel conduit to capture carbon dioxide produced in the flame chamber to produce a fluidizing gas used to fluidize the fluidized, pulverized, solid fuel conducted through the fuel-transport passageway formed in the solid-fuel conduit.

23. An apparatus for combining oxygen and fuel to produce a mixture to be burned in a burner, the apparatus comprising a fuel supply system including a solid-fuel conduit formed to include a fuel transport passageway, the solid-fuel conduit including a side wall formed to include oxygen-injection holes opening into the fuel transport passageway, and first oxygen conductor means for conducting a first stream of oxygen through the oxygen-injection holes formed in the side wall of the solid-fuel conduit to mix with fluidized, pulverized, solid fuel conducted through the fuel transport passageway prior to combustion to produce an oxygen-enriched, not spontaneously combustible, oxygen-fuel transport mixture, wherein the first oxygen conductor means includes a first oxygen-supply housing formed to include first and second openings, an oxygen chamber adapted to receive a supply of oxygen, and an oxygen inlet adapted to admit oxygen into the oxygen chamber, and the solid-fuel conduit extends through the first and second openings to place the oxygen-injection holes in the oxygen chamber to allow oxygen extant in the oxygen chamber to flow through the oxygen-injection holes in the fuel transport passageway formed in the solid-fuel conduit and further comprising an outer tube and wherein the fuel supply system further includes an oxygen-fuel nozzle formed to include an oxygen-fuel transport passageway and coupled to the solid-fuel conduit to receive the oxygen-enriched, not spontaneously combustible, oxygen-fuel transport mixture discharged from the solid-fuel conduit in the oxygen-fuel transport passageway, a portion of the solid-fuel conduit and the oxygen-fuel nozzle extends into the outer tube to define an oxygen flow passage therebetween, the oxygen-fuel nozzle is formed to include oxygen-injection means for admitting a stream of oxygen flowing through the oxygen flow passage into the oxygen-fuel transport passageway formed in the oxygen-fuel nozzle to enrich the concentration of oxygen in the oxygen-enriched, not spontaneously combustible, oxygen-fuel transport mixture extant in the oxygen-fuel transport passageway to establish an oxygen-fuel mixture flowing in the oxygen-fuel transport passageway and exiting through an oxygen-fuel outlet opening formed in the oxygen-fuel nozzle.

24. The apparatus of claim 23, further comprising an oxygen supply coupled to the first oxygen conductor means and second oxygen conductor means for conducting a second stream of oxygen from the oxygen supply into the oxygen flow passage.

25. The apparatus of claim 23, further comprising a refractory shape formed to include a flame chamber having an inlet opening and an outlet opening and receiving the oxygen-fuel mixture exiting through the oxygen-fuel outlet opening formed in the oxygen-fuel nozzle and passing into the inlet opening of the flame chamber, the refractory shape also being formed to include a staged-oxygen bypass conduit arranged to conduct oxygen outside of the flame chamber to the outlet opening of the flame chamber, a second oxygen-supply housing arranged to cooperate with the outer tube to define a second oxygen chamber adapted to receive a supply of oxygen, the second oxygen-supply housing being formed to include an oxygen inlet adapted to admit oxygen into the second oxygen chamber and an oxygen outlet arranged to discharge oxygen extant in the second oxygen chamber into the staged-oxygen bypass conduit, and wherein the outer tube is formed to include a second set of oxygen-injection holes opening into the oxygen flow passage to conduct oxygen extant in the second oxygen chamber into the oxygen flow passage to supply oxygen to the oxygen-injection means formed in the oxygen-fuel nozzle.

26. The apparatus of claim 23, further comprising a burner unit formed to include a flame chamber arranged to receive the oxygen-enriched, not spontaneously combustible, oxygen-fuel transport mixture and a carbon dioxide capture and sequestration system coupled to the burner unit and to the solid-fuel conduit to capture carbon dioxide produced in the flame chamber to produce a fluidizing gas used to fluidize the fluidized, pulverized, solid fuel conducted through the fuel-transport passageway formed in the solid-fuel conduit.

27. An apparatus for combining oxygen and fuel to produce a mixture to be burned in a burner, the apparatus comprising a fuel supply system including a solid-fuel conduit formed to include a fuel transport passageway, the solid-fuel conduit including a side wall formed to include oxygen-injection holes opening into the fuel transport passageway, first oxygen conductor means for conducting a first stream of oxygen through the oxygen-injection holes formed in the side wall of the solid-fuel conduit to mix with fluidized, pulverized, solid fuel conducted through the fuel transport passageway prior to combustion to produce an oxygen-enriched, not spontaneously combustible, oxygen-fuel transport mixture, a refractory shape formed to include a flame chamber receiving the oxygen-fuel mixture produced in the fuel transport passageway and having an inlet opening and an outlet opening, a staged-oxygen bypass conduit arranged to conduct oxygen outside of the flame chamber to the outlet opening of the flame chamber, second oxygen conductor means for conducting a second stream of oxygen to the inlet opening of the flame chamber and to the staged-oxygen bypass conduit to enrich the concentration of oxygen in the oxygen-enriched, yet not spontaneously combustible, oxygen-fuel transport mixture in the flame chamber to produce an oxygen-fuel mixture in the flame chamber, conducting means for conducting a stream of fluidizing gas into the fuel transport passageway, means for discharging a pulverized solid fuel into the stream of fluidizing gas to produce a fluidized, pulverized, solid fuel flowing through the fuel transport passageway, an oxygen supply, and distribution means for varying an amount of primary oxygen supplied by the oxygen supply to the first oxygen conductor means and secondary oxygen supplied by the oxygen supply to the second oxygen conductor means to regulate the relative concentration of oxygen in the oxygen-enriched, yet not spontaneously combustible, oxygen-fuel transport mixture established in the fuel transport passageway and the oxygen-fuel mixture extant in the flame chamber so that a selected ratio of primary and secondary oxygen is achieved to optimize emissions generated by burning the oxygen-fuel mixture extant in the flame chamber and adjust for variations in physical properties of pulverized solid fuel discharged into the stream of fluidizing gas.

28. The apparatus of claim 27, further comprising a carbon dioxide capture and sequestration system coupled to the flame chamber and to the solid-fuel conduit to capture carbon dioxide produced in the flame chamber to produce the stream of fluidizing gas used in the conducting means.

29. An apparatus for combining oxygen and fuel to produce a mixture to be burned in a burner, the apparatus comprising a fuel supply system including a solid-fuel conduit formed to include a fuel transport passageway, the solid-fuel conduit including a side wall formed to include oxygen-injection holes opening into the fuel transport passageway, first oxygen conductor means for conducting a first stream of oxygen through the oxygen-injection holes formed in the side wall of the solid-fuel conduit to mix with fluidized, pulverized, solid fuel conducted through the fuel transport passageway prior to combustion to produce an oxygen-enriched, not spontaneously combustible, oxygen-fuel transport mixture, a refractory shape formed to include a flame chamber receiving the oxygen-fuel mixture produced in the fuel transport passageway and having an inlet opening and an outlet opening, a staged-oxygen bypass conduit arranged to conduct oxygen outside of the flame chamber to the outlet opening of the flame chamber, second oxygen conductor means for conducting a second stream of oxygen to the inlet opening of the flame chamber and to the staged-oxygen bypass conduit to enrich the concentration of oxygen in the oxygen-enriched, yet not spontaneously combustible, oxygen-fuel transport mixture in the flame chamber to produce an oxygen-fuel mixture in the flame chamber, means for conducting a stream of fluidizing gas into the fuel transport passageway, means for discharging a pulverized solid fuel into the stream of fluidizing gas to produce a fluidized, pulverized, solid fuel flowing through the fuel transport passageway, an oxygen supply, and distribution means for varying an amount of primary oxygen supplied by the oxygen supply to the first oxygen conductor means and secondary oxygen supplied by the oxygen supply to the second oxygen conductor means to regulate the relative concentration of oxygen in the oxygen-enriched, yet not spontaneously combustible, oxygen-fuel transport mixture established in the fuel transport passageway and the oxygen-fuel mixture extant in the flame chamber so that a selected ratio of primary and secondary oxygen is achieved to optimize emissions generated by burning the oxygen-fuel mixture extant in the flame chamber and adjust for variations in physical properties of pulverized solid fuel discharged into the stream of fluidizing gas, wherein the distribution means includes a first oxygen supply tube arranged to conduct oxygen from the oxygen supply to the first oxygen conductor means, a primary oxygen-fuel ratio controller valve associated with the first oxygen supply tube to regulate flow of oxygen from the oxygen supply to the first oxygen conductor means, a second oxygen supply tube arranged to conduct oxygen from the oxygen supply to the second oxygen conductor means, a staged oxygen-fuel ratio controller valve associated with the second oxygen supply tube to regulate flow of oxygen from the oxygen supply to the second oxygen conductor means, and control system means for opening and closing the primary and staged oxygen-fuel ratio controller valves to establish the selected ratio of primary and staged oxygen.

30. The apparatus of claim 29, further comprising a burner unit formed to include a flame chamber arranged to receive the oxygen-enriched, not spontaneously combustible, oxygen-fuel transport mixture and a carbon dioxide capture and sequestration system coupled to the burner unit and to the solid-fuel conduit to capture carbon dioxide produced in the flame chamber to produce a fluidizing gas used to fluidize the fluidized, pulverized, solid-fuel conducted through the fuel-transport passageway formed in the solid-fuel conduit.

31. An apparatus for combining oxygen and fuel to produce a mixture to be burned in a burner, the apparatus comprising a refractory shape formed to include a flame chamber having an inlet opening and an outlet opening, a staged-oxygen bypass conduit arranged to conduct oxygen to the outlet opening of the flame chamber, a fuel supply tube formed to include an inlet adapted to be coupled to a supply of fluidized, pulverized, solid fuel, an outlet coupled to the inlet opening of the flame chamber, and a passageway extending therethrough from the inlet to the outlet to discharge fuel into the flame chamber, a first oxygen supply housing coupled to the fuel supply tube to define a first oxygen chamber, the fuel supply tube being formed to include a first set of oxygen-injection holes to allow oxygen extant in the first oxygen chamber to pass into a stream of fluidized, pulverized, solid fuel passing through the passageway and moving in a direction toward the flame chamber, a second oxygen supply housing arranged to define a second oxygen chamber and coupled to the staged-oxygen bypass conduit to allow oxygen extant in the second oxygen chamber to pass through the staged-oxygen bypass conduit to intercept any flame produced by ignition of a fuel discharged into the flame chamber from the fuel supply tube, a first oxygen conductor coupled to an oxygen inlet formed in the first oxygen supply housing and configured to conduct a first stream of oxygen into the first oxygen chamber, a second oxygen conductor coupled to an oxygen inlet formed in the second oxygen supply housing and configured to conduct a second stream of oxygen into the second oxygen chamber, a primary oxygen-fuel ratio controller coupled to the first oxygen conductor and configured to regulate flow of oxygen into the first oxygen chamber, a secondary oxygen-fuel ratio controller coupled to the second oxygen conductor and configured to regulate flow of oxygen into the second oxygen chamber, and control means for operating the primary and secondary oxygen-fuel ratio controllers to regulate the relative concentration of oxygen in a first oxygen-fuel mixture established in the passageway formed in the fuel supply tube when primary oxygen from the first oxygen chamber flows through the first set of oxygen-injection holes formed in the fuel supply tube to mix with fluidized, pulverized, solid fuel passing therethrough and in an oxygen-enriched oxygen-fuel mixture established by mixing the first oxygen-fuel mixture with secondary oxygen discharged from the staged-oxygen bypass conduit so that a selected ratio of primary and secondary oxygen is achieved to optimize emissions generated by burning an oxygen-fuel mixture extant in the flame chamber and adjust for variations in physical properties of pulverized solid fuel included in the fluidized, pulverized solid fuel.

32. The apparatus of claim 31, wherein the fuel supply tube is formed to include a second set of oxygen-injection holes to allow oxygen to flow therethrough into the passageway formed in the fuel supply tube to mix with an oxygen-fuel mixture passing therethrough and further comprising means for conducting oxygen extant in the second oxygen chamber into the passageway formed in the fuel supply tube through the second set of oxygen-injection holes.

33. The apparatus of claim 31, further comprising a carbon dioxide capture and sequestration system coupled to the flame chamber and to the fuel supply tube to capture carbon dioxide produced in the flame chamber to produce the stream of fluidizing gas used to fluidized the stream of fluidized, pulverized, solid fuel.

* * * * *